United States Patent
Mathieu et al.

(10) Patent No.: US 10,748,665 B2
(45) Date of Patent: Aug. 18, 2020

(54) NUCLEAR-REACTOR CONTROL-ABSORBER DRIVE MECHANISM AND CORRESPONDING MONITORING METHOD AND NUCLEAR REACTOR

(71) Applicant: Société Technique pour l'Energie Atomique, Villiers le Bacle (FR)

(72) Inventors: Jérémy Mathieu, Aix-en-Provence (FR); Michel Brun, Simiane-Collongue (FR)

(73) Assignee: SOCIÉTEÉ TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 159 days.

(21) Appl. No.: 16/092,729

(22) PCT Filed: Apr. 13, 2017

(86) PCT No.: PCT/EP2017/058931
§ 371 (c)(1),
(2) Date: Oct. 10, 2018

(87) PCT Pub. No.: WO2017/178588
PCT Pub. Date: Oct. 19, 2017

(65) Prior Publication Data
US 2019/0122775 A1    Apr. 25, 2019

(30) Foreign Application Priority Data

Apr. 15, 2016 (FR) ...................... 16 53366

(51) Int. Cl.
*G21C 7/00* (2006.01)
*G21C 7/12* (2006.01)
(Continued)

(52) U.S. Cl.
CPC ............... *G21C 7/12* (2013.01); *G05B 19/00* (2013.01); *G21C 7/18* (2013.01); *G21C 7/36* (2013.01);
(Continued)

(58) Field of Classification Search
CPC ... G21C 7/12; G21C 7/18; G21C 7/36; G21C 9/00
See application file for complete search history.

(56) References Cited

U.S. PATENT DOCUMENTS 3,619,675 A * 11/1971 Baker ................. F16H 25/2266
376/234
3,989,589 A * 11/1976 Frisch ....................... G21C 7/16
376/230
(Continued)

FOREIGN PATENT DOCUMENTS

EP         0182774 A2    5/1986
JP       H05312982 A   11/1993

OTHER PUBLICATIONS

Corresponding Search report for PCT/EP2017/058931.

*Primary Examiner* — Bentsu Ro
(74) *Attorney, Agent, or Firm* — Davidson, Davidson & Kappel, LLC

(57) ABSTRACT

A nuclear-reactor control-absorber drive mechanism includes a device for monitoring a potential situation of increase to overspeed of the absorber, configured to measure the number of control steps delivered to at least one of the first, second and third phases of the stator during a time window of preset duration or the number of rotation steps of the rotor during a time window of preset duration. The drive is also configured to compare the number of measured control steps with a preset maximum or the number of measured rotation steps with a preset maximum.

15 Claims, 4 Drawing Sheets

(51) Int. Cl.
*G21C 7/18* (2006.01)
*G21C 7/36* (2006.01)
*G21C 9/00* (2006.01)
*G05B 19/00* (2006.01)
*G05B 19/05* (2006.01)

(52) U.S. Cl.
CPC .............. *G21C 9/00* (2013.01); *G05B 19/056* (2013.01); *G05B 2219/161* (2013.01); *Y02E 30/39* (2013.01)

(56) References Cited

U.S. PATENT DOCUMENTS

| | | | | |
|---|---|---|---|---|
| 3,992,255 A | * | 11/1976 | DeWesse | G21C 7/12 376/228 |
| 4,034,277 A | | 7/1977 | Leenhouts | |
| 4,777,010 A | | 10/1988 | Sato | |
| 5,009,834 A | * | 4/1991 | Tessaro | G21C 7/14 376/232 |
| 2015/0325318 A1 | * | 11/2015 | Singh | G21C 7/14 376/228 |

\* cited by examiner

NUCLEAR-REACTOR CONTROL-ABSORBER DRIVE MECHANISM AND CORRESPONDING MONITORING METHOD AND NUCLEAR REACTOR

The invention generally relates to nuclear-reactor control-absorber drive mechanisms.

More specifically, according to a first aspect, the invention relates to a drive mechanism for at least one nuclear reactor control absorber, the mechanism being of the type including:
- at least one electric motor of the stepping type including a stator having at least first, second and third phases and a rotor;
- an electric power supply, electrically connected to each of the first, second and third phases of the stator;
- a controller of the electric power supply, programmed so that the electric power supply delivers electric pulses to each of the first, second and third phases at a current frequency, each electric pulse forming a control step with a shape adapted to the control of the motor, the rotor being moved per unit of time by a number of rotation steps depending on said frequency;
- a kinematic chain arranged to couple the rotor to the control absorber, the kinematic chain being arranged to convert a rotational movement of the rotor into a translational movement of said control absorber in the core of the reactor, with no possibility of slipping.

BACKGROUND

The rapid extraction events of a control absorber are among the main reactivity incidents in a nuclear reactor. These events may cause an injection of reactivity into the core of the reactor too fast to be detected by the neutron measuring chains and to be processed by the central command control system before a critical accident occurs.

Outside maintenance situations, the main cause of such an event is a failure of the control of the drive mechanism or the electric motor.

It is important to note that any reactor, due to its design, has an anti-reactivity margin $\beta$ such that the injection of reactivity $\Delta\rho0\beta$, in a very short length of time, or even in stages, does not cause any critical neutronic consequence.

Conversely, an excessive injection of reactivity, when it exceeds $\beta$, causes very rapid and uncontrollable seizing of the neutronic power (passage to prompt criticality causing doubling of the neutronic power in just a few milliseconds).

Due to the significance of the potential consequences, it is necessary to establish very high safety measures, if one wishes to rule out this event at the design stage.

Furthermore, the speed with which the considered incident may develop makes an a posteriori control by observation of the neutron flux difficult. The time necessary to implement corrective measures upon detecting a sudden increase in the neutron flux ranges from several seconds to several tens of seconds, which is much too late.

This problem is particularly acute in the case of a nuclear reactor designed to:
- preclude the ejection of control absorbers under the effect of the hydraulic thrust of the primary fluid, for example if the cover crossmember breaks if the drive mechanism is housed outside the vessel;
- preclude the mechanical rising of the control absorber, upon internal or external attack without a force being applied on a mechanism.

Integrated reactors of the SMR (Small and Modular Reactor) type are designed in this way, in order to improve safety. Typically, they comprise submerged drive mechanisms, with no cover crossmember. As a result, the reactivity injections associated with failures of the control of the drive mechanism are no longer covered by the envelope event for ejection of the control clusters.

Several technical solutions exist to control the rise speed of the control absorbers.

A first possibility is to use pawl mechanisms. These mechanisms have been used for some time, in many nuclear reactors. They mechanically limit the movement speed of the absorbers. A submerged version of a pawl mechanism is disclosed by US 2012/148007. Such submerged mechanisms have significant drawbacks: they are mechanically complex, and have a substantial radial bulk.

It is also possible to use DC rotary motors. The control of the nominal speed and the movement monitoring of the absorbers is provided by similar devices limiting the voltage applied to the motor. In such a mechanism, the rise speed of the absorber depends on the torque. As a result, the operating point of the mechanism can evolve over time with the voltage, the efficiency of the reduction gears, friction, etc. It is thus necessary to account for a significant margin between the nominal speed and the overspeed in the safety studies, typically a factor 3. This is detrimental for the control of the reactor.

It is also possible to use AC rotary motors. In this case, the control of the overspeed is provided by guaranteeing a perfectly bounded frequency of the network, typically 50 or 60 hertz. This is problematic in some countries or for some sites, in which the frequency of the network is not perfectly controlled.

For both types of rotary motor mechanism, the principle to avoid the event considered above consists of controlling the rise speed of the absorbers upon failure, and checking that the associated reactivity injection $\Delta\rho0$ during the reaction time frame of the control chains of the reactivity of the central command control of the nuclear reactor remains below the prompt criticality threshold $\beta$, with a significant margin corresponding to the design options.

This approach raises two problems.

The actual rise speed of the absorbers depends on the ratio between the motor torque and the resisting torque, and is therefore a complex function of multiple parameters: mass, efficiency of the reducing gears, friction, supply voltage, etc.

These parameters evolve over time. It is thus necessary to adopt safety margins that penalize the ability to reconcile a rapid descent speed, and a limited maximum ascent speed.

Furthermore, when the neutron flux is weak, the response time of each of the chains of the central command control is high. This response time is typically from several seconds to several tens of seconds.

Lastly, known from U.S. Pat. No. 4,777,010 is a drive mechanism for at least one control absorber in which the absorber is moved by an electric motor of the stepping type.

SUMMARY OF THE INVENTION

In this context, the present disclosure provides a drive mechanism that does not have the above flaws.

To that end, a drive mechanism of the aforementioned type is provided, characterized in that the drive mechanism includes a device for monitoring a potential situation of increased to overspeed of the absorber, the monitoring device including at least two mutually independent monitoring units, each connected to the terminals of one of the first, second and third phases, each monitoring unit being configured to:

measure the number of control steps delivered to said phase during a time window of preset duration or the number of rotation steps of the rotor during a time window of preset duration;

compare the number of measured control steps with a preset maximum or the number of measured rotation steps with a preset maximum.

In a stepping motor, any event affecting the motor torque (applied voltage, current, etc.) and/or the resisting torque (change to the efficiency of the kinematic chain, hydraulic phenomenon occurring within the vessel of the reactor, etc.) affects only the performance speed of a single step. Conversely, the macroscopic speed over several steps only depends on the frequency of the command, as long as the latter remains low enough that the motor does not stall.

By construction, the motor therefore cannot turn faster than the frequency imposed by the command, beyond, at worst, several steps of the motor. The kinematic chain is additionally designed to couple the motor to the absorber without any possibility of slipping. As a result, the frequency of the electric pulses is safely an increasing image of the average speed of increase of the absorber over several steps. The number of electric pulses delivered to each phase during a time window of preset duration, or the number of rotation steps of the rotor during the time window of preset duration, therefore constitutes a safe, increasing indication of the movement of the absorber. If this number of electric pulses or this number of steps exceeds a preset maximum, there is a presumption of overly fast rotation of the motor and therefore excessively high speed of increase of the absorber.

Such an approach allows a safe action in a short loop, due to the fact that a parameter representative of the command is measured, and not the actual evolution of the nuclear power. The safety action may be carried out in a very short length of time in light of the operational reactivity injection speeds. It is thus possible to interrupt the supply of electricity to the motor in a few hundred milliseconds.

The total reactivity injected before cutting off the electrical power supply therefore depends little on hypotheses made on the maximum possible movement speeds upward or downward, and therefore yields wide margins in defining the motorization, as described later.

The drive mechanism may further have one or more of the features below, considered individually or according to any technical possible combination(s):

the monitoring device includes at least first, second and third mutually independent monitoring units, connected to the terminals of the first, second and third phases, respectively, the first and second unit each being configured to measure the number of control steps during the time window of preset duration, and to cut off the electric power supply if the preset maximum is exceeded;

the third unit being configured to measure the number of rotation steps of the rotor during the time window of preset duration, and to cut off the electric power supply if the preset maximum is exceeded;

the first and second units each comprise at least one of the following circuits:

a logic circuit configured to count the number of electric pulses respectively delivered to the first phase or the second phase;

an analog circuit configured to count the number of electric pulses respectively delivered to the first phase or the second phase;

a logic or analog circuit for comparing electric pulses respectively delivered to the first phase or the second phase with a preset profile;

the third unit is configured to detect the crossing of a rotation step by the rotor by impedance measurement across the terminals of the third phase of the stator;

the monitoring device includes, in addition to the first and second monitoring units, a first and/or second measuring unit configured to measure an impedance across the terminals of the first or second phase, respectively, and a unit using the impedance measurement across the terminals of at least two of the first, second and third phases to determine the position of the absorber;

the first, second and third units are configured to cut off the electric power supply by respectively acting on first, second and third mutually independent switches if the number of control steps or the number of rotation steps exceeds the corresponding preset maximum;

the kinematic chain is configured so that the maximum number of electric pulses or rotation steps drives a reactivity contribution below an anti-reactivity limit ($\beta$) excluding a preset prompt criticality accident of the reactor, minus a margin preset by safety analyses; and the kinematic chain provides position maintenance even upon cutoff of the power supply of the motor.

A method is also provided for monitoring a potential situation of increase to overspeed of a nuclear reactor control absorber equipped with a drive mechanism of said control absorber including:

at least one electric motor of the stepping type including a stator having at least first, second and third phases and a rotor;

an electric power supply, electrically connected to each of the first, second and third phases of the stator;

a controller of the electric power supply, programmed so that the electric power supply delivers electric pulses to each of the first, second and third phases at a current frequency, each electric pulse forming a control step with a shape adapted to the control of the motor, the rotor being moved per unit of time by a number of rotation steps depending on said frequency;

a kinematic chain arranged to couple the rotor to the control absorber, the kinematic chain being arranged to convert a rotational movement of the rotor into a translational movement of said absorber in the core of the reactor, with no possibility of slipping;

the method including at least two mutually independent monitoring steps, each monitoring step including the following operations:

measuring, across the terminals of one of the first, second and third phases, the number of control steps delivered to said phase during a time window of preset duration or the number of rotation steps of the rotor during a time window of preset duration;

comparing the number of measured control steps with a preset maximum or the number of measured rotation steps with a preset maximum.

The monitoring method may also have one or more of the features below:

the monitoring method includes:

first and second monitoring steps during which the number of control steps respectively delivered to the first and second phases during the time window of preset duration is measured across the terminals of the phase, the electric supply being cut off if the preset maximum is exceeded;

a third monitoring step during which the number of rotation steps of the rotor during the time window of preset duration is measured across the terminals of the third phase, the electric supply being cut off if the preset maximum is exceeded.

in the first and second monitoring steps, the number of control steps respectively delivered to the first phase and the second phase is counted by detecting the voltage edges or the current edges;

in the third monitoring step, the number of rotation steps of the rotor is counted by measuring an impedance across the terminals of the third phase;

the method includes, in addition to the first and second monitoring steps, a first and/or second measuring step during which, respectively, the number of rotation steps of the rotor is counted by measuring an impedance across the terminals of the first and second phase, the method including a step for determining the position of the absorber using the impedance measurement across the terminals of at least two of the first, second and third phases;

during the first, second and third steps, the electric supply of the electric motor is cut off by respectively acting on first, second and third mutually independent switches if the number of electric pulses or the number of rotation steps exceeds the corresponding preset maximum; and the kinematic chain is configured so that the maximum number of electric pulses or rotation steps drives a reactivity contribution below an anti-reactivity limit excluding a preset prompt criticality accident of the reactor, minus a margin preset by the safety analyses.

A nuclear reactor is also provided equipped with control absorber drive mechanisms having the above features.

BRIEF SUMMARY OF THE DRAWINGS

Other features and advantages of the invention will emerge from the detailed description thereof provided below, for information and non-limitingly, in reference to the appended figures, in which.

DETAILED DESCRIPTION

Figure 1:
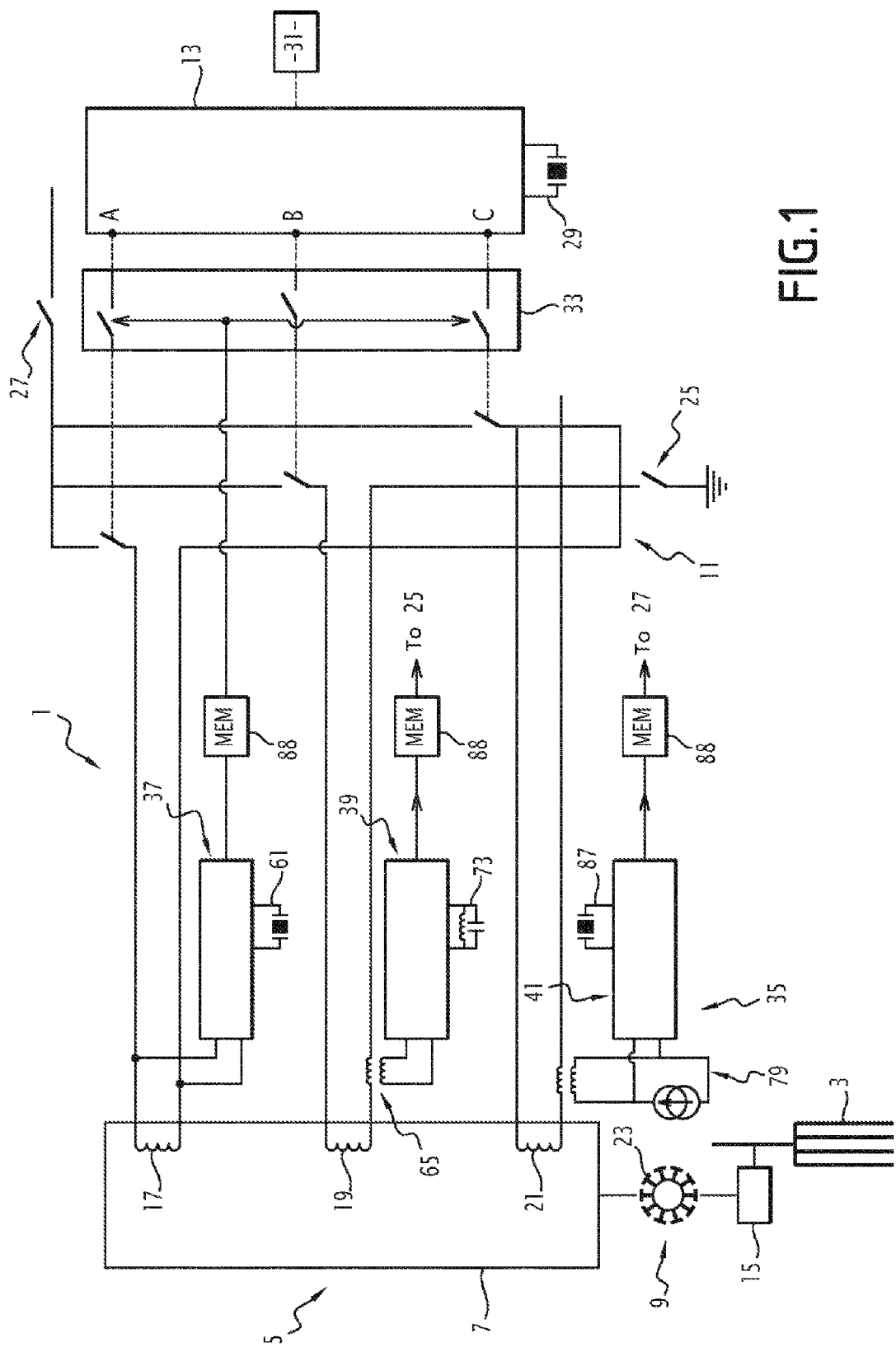
FIG. 1 is a schematic illustration of a nuclear reactor control absorber drive mechanism according to a first embodiment of the invention.

The drive mechanism 1 shown in FIG. 1 is intended to move a control absorber 3 of a nuclear reactor.

A nuclear reactor typically comprises a vessel and a core arranged in the vessel. The core comprises a plurality of nuclear fuel assemblies. The nuclear reactor further comprises a large number of control absorbers, movable in the core of the nuclear reactor so as to control the neutron flux emitted by the nuclear fuel assemblies. These absorbers are for example referred to as "control rods". They are made from a material absorbing the neutrons.

Each control absorber is associated with a drive mechanism, which is provided to move the absorber relative to the fuel assemblies along a generally vertical direction.

The nuclear reactor is typically a pressurized water reactor (PWR), or a boiling water reactor (BWR).

Alternatively, it is of any other suitable type.

For example, the nuclear reactor is of the SMR type.

Typically, said nuclear reactor is of the type precluding, by design, the ejection of absorbers under the effect of the hydraulic thrust of the primary fluid, and mechanical rising on internal or external attack without a force being applied to the mechanism. Preferably, the reactor is the type with no cover crossmember, the drive mechanisms being completely submerged in the vessel.

As illustrated in FIG. 1, the mechanism 1 includes at least one electric motor 5 of the stepping type provided with a stator 7 and a rotor 9, an electric supply 11, a controller 13 of the electric supply 11, and a kinematic chain 15 arranged to couple the rotor 9 to the control absorber 3, with no possibility of slipping.

Typically, the mechanism 1 comprises a single electric motor for each absorber 3.

Motors of the stepping type are known and will therefore not be described in detail here.

The electric motor 5 is of any suitable type, for example the electric motor is a variable reluctance motor, or a permanent magnet motor or a hybrid motor.

The stator 9 comprises at least three phases 17, 19, 21, or more than three phases.

The rotor 9 comprises a plurality of teeth 23.

The electric power supply 11 is electrically connected to each of the phases of the stator 7, in particular the first, second and third phases 17, 19 and 21.

The controller 13 is programmed so that the electric power supply 11 delivers, to each of the first, second and third phases 17, 19, 21, electric pulses at a current frequency. Each electric pulse forms a control step, with a shape adapted to the control of the motor. The electric pulses are for example slots as shown in the figures, but alternatively have shapes other than slots.

Typically, the controller 13 is programmed so that the electric power supply delivers electric pulses successively to the first, second and third phases 17, 19, 21. Each electric pulse typically causes the rotor to rotate. The number of control steps, i.e., the number of pulses necessary to perform a complete revolution of the rotor, depends on the number of phases, the number of teeth 23, and the form of the command.

The rotation step of the rotor is related to the control step by a fixed relationship only depending on the structure of the motor: number of teeth 23 of the rotor, number of phases (here 3) and number of coils per phase. Typically, a control step rotates the rotor over one rotation step. The number of control steps is therefore theoretically equal to the number of rotations steps of the rotor. Alternatively, for example for complex controls, a control step rotates the rotor over more or less than one rotation step. The number of control steps is not equal to the number of rotations steps of the rotor.

Thus, the rotor 9 is rotated per unit of time by a number of rotation steps that depends on the current frequency.

The kinematic chain 15 is arranged to convert the rotational movement of the rotor 9 into a translational movement of the absorber 3 in the core of the reactor. It is of any type suitable for not allowing slipping (e.g., screw/nut).

Preferably, the kinematic chain 15 provides the maintenance in position of the absorber without it being necessary to maintain a motor torque. Typically, if the electric power supply 11 of the motor is cut, the control absorber 3 remains in place and is not driven downward by its weight. Several typical solutions exist for achieving this property. For example, this is done by providing a drive member of the screw/nut type in the kinematic chain 15, with a pitch chosen to be irreversible. Another solution is to add a brake (for example a friction brake or a hysteresis brake) into the kinematic chain.

The electric power supply 11 comprises first and second breakers 25 and 27. The electric motor 5 is supplied with electricity when the first and second breakers 25, 27 are in the closed position. The transmission of electric power toward the motor 5 is interrupted if one or the other of the breakers is open.

The first and second breakers 25, 27 are mutually independent and use different technologies from one another. They are normally always closed. For example, the first breaker 25 is a voltage loss relay, and the second breaker 27 is a switch gate.

The controller 13 typically has a conventional design. It comprises a unique time base 29, making it possible to calibrate the repetition duration and frequency of the pulses delivered by the electric power supply 11 to the first, second and third phases 17, 19, 21. The controller 13 receives operational orders from a control member 31, commanding the raising or lowering of the control absorber 3. The controller 13 converts these operational orders into electric control pulses with appropriate shapes and frequencies for each of the first, second and third phases 17, 19, 21 of the stator.

The mechanism 1 further comprises an inhibiting device 33 inserted between the controller 13 and the electric power supply 11. The device 33 is configured to inhibit the transmission of commands from the controller 13 to the electric power supply 11 under preset conditions requiring the cutoff of the power supply of the motor 5.

The drive mechanism 1 includes a monitor in the form of a device 35 for monitoring a potential situation of increase to overspeed of the control absorber 3. The monitoring device 35 includes at least two mutually independent monitoring units, each connected to the terminals of one of the first, second and third phases 17, 19, 21, each monitoring unit being configured to:
  measure the number of control steps delivered to said phase 17, 19, 21 during a time window Tobs of preset duration, or measure the number of rotation steps of the rotor 9 during a time window of preset duration T'obs;
  compare the number of measured control steps with a preset maximum Nmax, or compare the number of measured rotation steps with a preset maximum N'max.

As explained above, the number of electric pulses delivered to each phase is an increasing image of the movement of the control absorber in the core of the reactor. The monitoring device declares a presumption of excessive speed of increase of the cluster if the number of electric pulses, or the number of rotation steps of the rotor, exceeds the corresponding preset maximum.

Preferably, and as illustrated in FIG. 1, the monitoring device 35 includes at least first, second and third physically and functionally mutually independent monitoring units 37, 39, 41, respectively connected to the terminals of the first, second and third phases 17, 19 and 21.

The first unit 37 is configured to measure the number of electric pulses delivered to the first phase 17 during the time window Tobs of preset duration, and to cut off the electric power supply 11 if the preset maximum Nmax is exceeded. To that end, the first unit 37 is advantageously configured to compare said number of measured electric pulses to the preset maximum Nmax.

Likewise, the second unit 39 is configured to measure the number of electric pulses delivered to the second phase 19 during the time window Tobs of preset duration, and to cut off the electric power supply 11 if the preset maximum Nmax is exceeded. To that end, the second unit 39 is advantageously configured to compare the number of measured electric pulses to the preset maximum Nmax.

The third unit 41 is configured to measure the number of rotation steps of the rotor 9 during the time window of preset duration T'obs and to cut off the electric power supply 11 if the preset maximum N'max is exceeded. To that end, the third unit 41 is advantageously configured to compare the measured number of rotation steps to the preset maximum N'max.

Thus, the monitoring device comprises at least two, preferably three, mutually independent redundant units, each capable of detecting the appearance of an excessively large number of control pulses in the time window, or an excessively large number of rotation steps of the rotor in the given time window.

The three units 37, 39, 41 use different technologies, and each have a unique time base.

Figure 2:
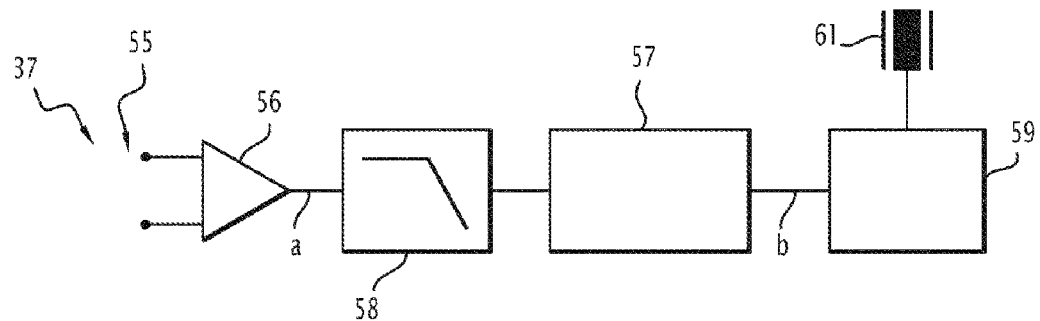
FIG. 2 is a schematic illustration of the first unit of the monitoring device of the mechanism of FIG. 1.

The first unit 37 is shown in FIG. 2. It comprises a logic circuit configured to count the number of electric pulses delivered to the first phase 17. It works on the voltage of the electric pulses delivered to the first phase 17.

Figure 3:
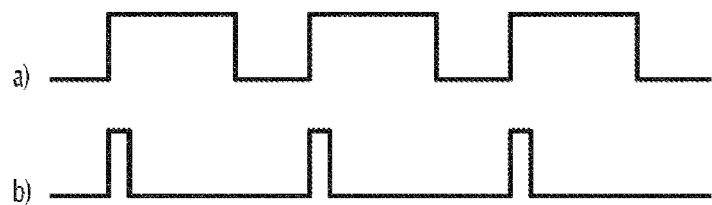
FIG. 3 illustrates the shape of the electric signals at points a and b of the first unit shown in FIG. 2.

The first unit 37 has an input 55 connected across the terminals of the first phase 17. The signal received at the input 55, shown on the upper line of FIG. 3, is steered toward an amplifier 56, which makes it possible to shape the signal measured across the terminals of the first phase 17. The first measuring unit 37 comprises a rising edge detector 57. A low-pass filter 58 is inserted between the output of the amplifier 56 and the input of the detector 57.

The detector 57 detects the rising edges of the electric pulses delivered by the electric power supply in the first phase 17. It is of any appropriate type, and for example uses the traditional scheme combining a signal with a delayed signal. The output signal of the detector 57 is illustrated on the lower line of FIG. 3.

The first unit 37 alternatively does not comprise the amplifier 56 and/or the low-pass filter 58.

The first unit 37 comprises a pulse logic counter 59. The output of the rising edge detector 57 is connected to the counter 59. The latter is also connected to a time base specific to said unit 37, for example an oscillator 61.

The counter 59 is recharged to the value Nmax periodically, the recharges being separated by a period Tobs. The value of the counter 59 is decreased by 1 each time the detector 57 detects a rising edge, i.e., detects an electric pulse delivered to the first phase. The first unit 37 cuts off the electric power supply of the motor if the counter 59 reaches zero.

The counter 59 is for example a logic circuit of type 74HC590, implementing binary counters of type 74HC59.

Figure 4:
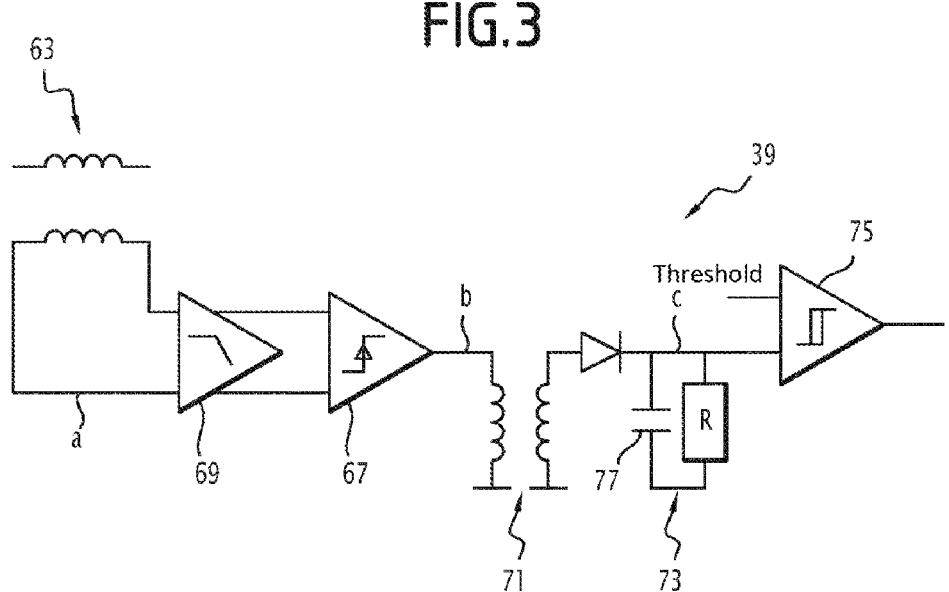
FIG. 4 is a schematic illustration of the second unit of the monitoring device of FIG. 1.

The second unit 39 is shown in FIG. 4. It comprises an analog circuit configured to count the number of electric pulses delivered to the second phase 19. Typically, the second unit 39 works on the current, i.e., the intensity of the electric pulses delivered to the second phase. Alternatively, it may work in voltage, like the first unit 37.

More specifically, the second unit 39 works by analog edge detection in the control current powering the second phase 19, using operational amplifiers. The time base is supplied by the charge discharge balance of a capacitance.

The second unit 39 has an input 63 typically made by a current transformer.

The second unit 39 further comprises a rising edge detector 67. Said detector 67 is for example an amplifier mounted as comparator at a value chosen to cleanly detect control switching, i.e., rising current edges.

A low-pass filter 69 is inserted before the detector 67.

The second unit 39 alternatively does not comprise the low-pass filter 69.

The second unit 39 comprises a pulse transformer 71, the input of which is connected to the output of the detector 67. The pulse transformer 71 charges, with a known value, an RC circuit 73 serving as a time base. The RC circuit 73 is also connected to the input of an amplifier 75 mounted as comparator.

The amplifier 75 is mounted so as to compare the average charge of the capacitance 77 of the RC circuit to a preset threshold.

If the number of pulses delivered by the pulse transformer 71 per unit of time, i.e., if the number of rising edges detected by the detector 67 is low enough per unit of time, the capacitance 77 is discharged enough between two pulses for its average charge to remain below the threshold. Otherwise, the charge of the capacitance increases gradually until it exceeds the threshold. The amplifier 75 then sends a signal commanding the cutoff of the electric motor 5.

The second unit 39 is arranged such that if a number Nmax of rising edges is detected during the time window Tobs, then the charge of the capacitance 77 exceeds the preset threshold.

Figure 5:
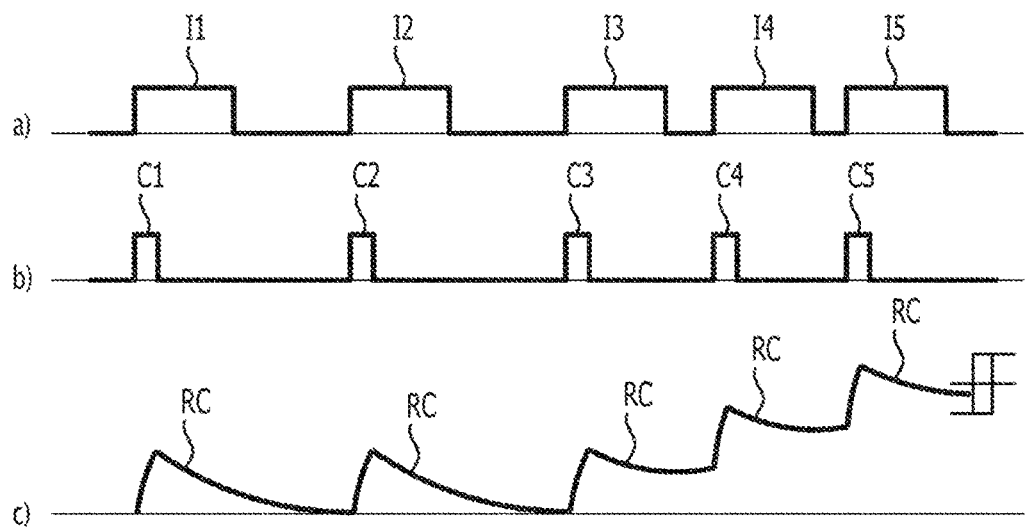
FIG. 5 shows the shape of the electric signals at points a, b and c of the second unit shown in FIG. 4.

The shape of the current delivered by the electric power supply to the second phase 19 as a function of time is shown on the upper line of FIG. 5. In the illustrated example, the first three pulses 11, 12 and 13 are relatively spaced apart over time. Conversely, the fourth pulse 14 is relatively close to the third pulse 13 and the fifth pulse 15 is also relatively close to the fourth pulse 14. The second line of FIG. 5 illustrates the signal at the output of the detector 67, as a function of time. One can see that the detector 67 has detected five rising edges, shown by the slots C1 to C5. The charge of the capacitance 77 as a function of time is shown on the lower line of FIG. 5. One can see that the charge of the capacitance 77 increases each time that the detector 67 sends a slot to the pulse transformer 71. It appears in FIG. 5 that, after the appearance of the first or second slot C1, C2, the capacitance has time to discharge completely before the appearance of the following slot. Conversely, because the slots C3, C4 and C5 are relatively close together, the capacitance 77 is not completely discharged when the next slot appears. Its capacitance therefore increases gradually, as illustrated in FIG. 5, when several pulses follow one another with close time intervals. After the appearance of the slot C5, the charge of the capacitance 77 exceeds the preset threshold.

Other methods for monitoring control signals are possible as a replacement and/or addition to the solutions previously described for the monitoring units 37 and 39. For example, the monitoring is based on the comparison of the control signal with a preset voltage or current profile. This method is typically adopted when the shape of the control signals of the motor is complex.

The principle is to provide the comparison of the control signal with minimum/maximum envelopes for example guaranteeing compliance with the high or low voltage plateau duration.

According to this method, the duration during which the voltage of the control signal is above a threshold, or below a threshold, or comprised between two thresholds, is for example compared with preset values.

This method therefore makes it possible to detect the frequency of high or low plateaus, and therefore the frequency of control steps.

The third unit 41 is configured to measure an impedance across the terminals of the third phase 21. This impedance is different depending on whether a tooth 23 of the rotor is present across from the coil or one of the coils of the phase 21, or whether none of the teeth 23 are located across from the coil or one of the coils of the phase 21. The third unit 41 therefore makes it possible to detect the appearance of a tooth 23 of the rotor across from a coil of the phase 21, this appearance of a tooth being the image of the actual performance of a rotation step of the rotor. The third unit 41 therefore allows direct counting of the number of rotation steps of the rotor during the time window of preset duration T'obs.

Figure 6:
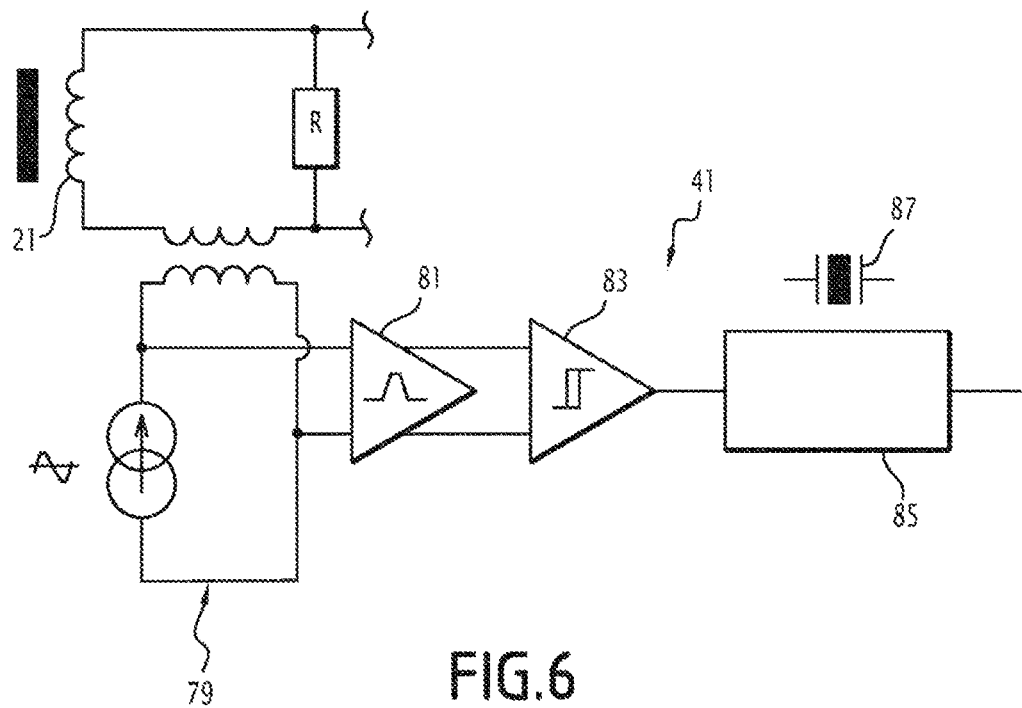
FIG. 6 is a schematic illustration of the third unit of the monitoring device of FIG. 1.

As shown in FIG. 6, the third unit 41 comprises a source 79 provided to inject an alternating signal across the terminals of the third phase 21. This alternating signal is superimposed on the command delivered by the power supply 11 to the third phase 21. In FIG. 6, this source is shown as an injection of current, but other solutions are possible. It has a much higher frequency than that of the command supplied by the electric power supply 11, for example at least five times higher, typically ten times higher. The injected alternating signal has a low power level, and is typically injected by a transformer or a capacitance.

The third unit 41 also comprises a bandpass filter 81 receiving, as input, the signal leaving the third phase 21, the alternating component of which at the injection frequency depends on the impedance related to the presence or absence of a tooth across from one or more coils of the phase 21.

The bandpass filter 81 is centered on the frequency of the injected alternating signal.

The third unit 41 further comprises a member 83 for measuring the voltage, in the frequency band selected by the bandpass filter, which provides an image of the inductance of the third phase. The inductance is high if a tooth of the rotor is across from the or a coil of the stator, and is low if no tooth of the stator is across from a coil of the third phase 21. The output signal of the member 83 is a binary signal, equal to 1 if a tooth 23 is across from a coil and 0 otherwise.

The third unit 41 comprises a pulse logic counter 85, performing a function similar to that described for the first unit. Preferably, it uses a different technology from that of the first unit.

The counter 85 is recharged to a value N'max every T'obs as a function of a time base specific to said unit 41, for example supplied by a local quartz 87. Upon each passage of a tooth detected by the measuring sub-unit 51, the value of the counter 85 is decreased by 1. The counter 85 sends a signal causing the motor 5 to stop if its value reaches 0 before recharging.

The first, second and third units 37, 39 and 41 are configured to cut off the electric power supply of the motor by respectively acting on first, second and third mutually independent switches if the number of electric pulses or the number of rotation steps exceeds the corresponding preset maximum.

In the illustrated example, the first unit 37 acts on the inhibiting device 33. The second unit 39 acts on the breaker 25. The third unit 41 acts on the breaker 27.

Each of the first, second and third units 37, 39, 41 comprises triggering storage 88, rearmed by the central command control system of the reactor. This storage is for example integrated into the switches 33, 25, 27. This storage allows a cutoff order to be irreversible until deliberate rearming, typically by the centralized control-command and/or the operator, after diagnosis of the causes having provoked said order.

One important aspect of the present disclosure is that the kinematic chain 15 is configured so that the maximum number Nmax of electric pulses or the maximum number N'max of rotation steps drives a reactivity contribution in the core below the preset anti-reactivity limit β of the reactor, with a margin preset by safety analyses. This margin is for example 10% of β.

Indeed, the maximum number of electric pulses corresponds to a maximum number of rotation steps of the rotor, which in turn corresponds to a movement of the control absorber in the core that depends on the characteristics of the kinematic chain. For example, for a kinematic chain of the screw/nut type, the movement of the control absorber within the core for a rotor step depends on the screw pitch.

A detailed example of sizing of the drive mechanism will now be described.

The reactivity is usually measured in pcm (percent mille), unit representing the evolution of the nuclear population.

The speed of rise of the control absorber 3 is set so as typically to correspond to an injection of reactivity of 10 pcm/s. The speed of descent of the control absorber Fdesc is set so as typically to obtain an injection of anti-reactivity of −30 pcm/s. This value for example makes it possible to pass the main pumping transitions without emergency stop.

The preset anti-reactivity state margin β is typically equal to 500 pcm.

The kinematic chain 15 is configured so that a rotor step corresponds to an injection of reactivity comprised between 0.5 and 5 pcm, preferably between 1 and 3 pcm, and typically equal to 1 pcm. This parameter is called efficiency of the injection of reactivity, and expressed in pcm per motor step.

The motor 3 is normally provided with a three-phase stator.

The motor 3 is calibrated so that its stalling speed when rising, i.e., the frequency beyond which the motor does not drive the rising of the absorber irrespective of the control frequency, is equal to k.Fdesc. The stalling speed is a physical characteristic of the motor that represents the fact that, beyond a certain control frequency, the motor can no longer follow the command.

Because of the inertia of the kinematic chain, if the motor is no longer supplied with power, the control absorber will continue to move, this movement corresponding to a maximum number of rotor steps Ni, generally comprised between 1 and 10.

An observation duration Tobs is considered here equal to 100 ms, sliding after each step. The duration T'obs is also equal to 100 ms.

In the sizing example presented here, the design option selected below consists of not considering the rotation direction in the sizing of the system. Then, in order not to experience untimely triggering during the normal lowering maneuvers (generally faster than the rising maneuvers), the lowering speed is considered below.

At the lowering speed, 100 ms corresponds to a number of lowering rotor steps Ndesc equal to 3. This value is calculated using the following formula:

$$Ndesc = Fdesc \times Tobs.$$

By for example selecting a margin of 2 steps to do away with untimely triggering, one may therefore consider that 5 rotor steps (or 5 control steps) in a period of 100 ms corresponds to an anomaly. This margin on the number of steps is selected to be tolerant with any detection of strays, irrespective of origin.

The maximum number of rotation steps N'max during the time window T'obs here is 5.

The maximum number Nmax of electric pulses delivered to one of the phases during the time window Tobs here is also 5.

Furthermore, a reaction time Tr=100 ms is used, corresponding to the response time of the switches when one of the three units 37, 39 and 41 detects an anomaly.

The number of rotor steps done in the rising direction in case of failure of the command is therefore capped by:

$$N0 = (Fdesc \times Tobs + 2) + kFdesc \times Tr + Ni$$

The corresponding reactivity injection is calculated using the following formula:

$$\Delta\rho 0 = N0 \times E$$

Among all of the sizing values indicated above, only the value of k (calibration of the stalling relative to the desired lowering speed) depends on the electromechanical design. If one wishes to eliminate the difficulties mentioned in the preamble of this application, it is important for the value of k only to have a second-order influence on N0. The sensitivity analysis summarized in the table below shows that even with a margin factor of 10 on the value of k, the injection of reactivity remains below 10% of the reactivity margin set out upon design β.

| | | | | | | |
|---|---|---|---|---|---|---|
| E | Kinematic chain efficiency | pcm/step | 1 | 1 | 1 | 1 |
| Fdesc | Lowering speed | step/s | 30 | 30 | 30 | 30 |
| Ni | Kinematic chain inertia upon motor cutoff | step | 2 | 2 | 2 | 2 |
| Tobs | Sliding observation duration | seconds | 0.1 | 0.1 | 0.1 | 0.1 |
| Tr | Reaction time | seconds | 0.1 | 0.1 | 0.1 | 0.1 |
| k | Stalling margin Fdec/Fmax | without | 1.5 | 2 | 5 | 10 |
| N0 | Number of untimely steps | without | 11.5 | 13 | 22 | 37 |
| Δρ0 | Injected reactivity in pcm | pcm | 11.5 | 13 | 22 | 37 |
| Δρ0 | Injected reactivity in % of β | % | 2% | 3% | 4% | 7% |

A method for monitoring a potential situation of increase to overspeed of a nuclear reactor control absorber is also provided.

This method is particularly suitable for being carried out by the drive mechanism having the above features.

Conversely, the drive mechanism is particularly suitable for carrying out the monitoring method that will now be described.

The monitoring method is intended for a nuclear reactor equipped with a control absorber drive mechanism including:

at least one electric motor 5 of the stepping type including a stator 7 having at least first, second and third phases 17, 19, 21 and a rotor 9;

an electric power supply 11, electrically connected to each of the first, second and third phases 17, 19, 21 of the stator 7;

a controller 13 of the electric power supply, programmed so that the electric power supply delivers electric pulses to each of the first, second and third phases 17, 19, 21 at a current frequency, the rotor 9 being moved per unit of time by a number of rotation steps depending on said frequency;

a kinematic chain 15 arranged to couple the rotor 9 to the control absorber 3, the kinematic chain 15 being arranged to convert a rotational movement of the rotor 9 into a translational movement of the absorber 3 in the core of the reactor, with no possibility of slipping.

Each electric pulse forms a control step, with a shape adapted to the control of the motor.

The electric motor 5, the electric power supply 11, the controller 13 and the kinematic chain 15 are in accordance with the description thereof provided above relative to the drive mechanism.

The monitoring method includes at least two mutually independent monitoring steps, each monitoring step including the following operations:

measuring, across the terminals of one of the first, second and third phases 17, 19, 21, the number of control steps delivered to said phase during a time window Tobs of preset duration or the number of rotation steps of the rotor 9 during a time window T'obs of preset duration;

comparing the number of measured control steps with a preset maximum number Nmax or the number of measured rotation steps with a preset maximum N'max.

More specifically, the monitoring method includes a first monitoring step during which the number of control steps delivered to the first phase 17 during the time window Tobs of preset duration is measured across the terminals of the first phase, the electric supply 11 being cut off if the preset maximum Nmax is exceeded.

To that end, the first step provides for a comparison of the number of control steps measured with the preset maximum Nmax.

The monitoring method typically further includes a second monitoring step during which the number of control steps delivered to the second phase 19 during the time window Tobs of preset duration is measured across the terminals of the second phase, the electric supply 11 being cut off if the preset maximum Nmax is exceeded.

To that end, the second step provides for a comparison of the number of control steps measured with the preset maximum Nmax.

The monitoring method advantageously also includes a third monitoring step during which the number of rotation steps of the rotor 9 during the time window T'obs of preset duration is measured across the terminals of the third phase, the electric supply 11 being cut off if the preset maximum N'max is exceeded.

To that end, the third step provides for a comparison of the number of control steps measured with the preset maximum N'max.

Typically, the various monitoring steps are carried out concomitantly, in parallel. They are repeated constantly, the monitoring of the rise speed of the control absorber being continuous and constant.

The first, second and third steps are carried out by first, second and third units that are physically and functionally mutually independent. These first, second and third units are of the type described above in reference to the drive mechanism 1.

Thus, in the first monitoring step, the number of control steps delivered to the first phase 17 is counted by detecting the voltage edges. Each voltage edge typically corresponds to an electric pulse delivered to the first phase 17.

The first step typically comprises the following operations:

acquiring the voltage across the terminals of the first phase 17;

optionally shaping the acquired voltage;

optionally applying a low-pass filter to the shaped voltage;

counting the number of electric pulses delivered to the first phase 17 by detecting the rising voltage edges in the acquired voltage;

periodically recharging a counter to the value Nmax, with a period of Tobs; upon each detected pulse, decreasing the value of the counter by 1. If the counter reaches the value 0, the number of delivered electric pulses is considered to be above the preset maximum Nmax.

The first step further comprises an operation for cutting off the electric power supply of the electric motor if the number of electric pulses exceeds the corresponding preset maximum Nmax.

To that end, one for example acts on the inhibiting device 33 described above.

In the second monitoring step, the number of electric pulses delivered to the second phase 19 is counted by detecting the current edges.

More specifically, the second monitoring step includes the following operations:

measuring the current, i.e., the intensity passing through the second phase 19;

optionally applying a low-pass filter to the measured current;

detecting the rising current edges, by comparing the value of the measured current with a preset threshold;

each time a current rising edge is detecting, charging, with a known value, an RC circuit 73 serving as a time base;

comparing the average charge of the capacitance 77 of the RC circuit 73 to a preset threshold.

As explained above, the RC circuit 73 is arranged such that if the number of rising current edges detected during the duration Tobs exceeds a preset number, the charge of the capacitance 77 exceeds the preset threshold. The number of electric pulses delivered to the second phase 19 is then considered to have exceeded the preset maximum Nmax.

Furthermore, the second monitoring step comprises an operation for cutting off the electric power supply of the electric motor 5 if the number of detected electric pulses exceeds the corresponding preset maximum Nmax. To that end, one acts on a second cut off member independent from the first, for example on the breaker 25 of the electric power supply.

In the third monitoring step, the number of rotation steps of the rotor 9 is counted by measuring an impedance across the terminals of the third phase 21.

More specifically, in the third monitoring step, the following operations are carried out:

injecting an alternating signal, for example a current, superimposed on the electric power supply of the third phase 21, with a frequency much higher than that of the electric power supply, and with a low voltage;

acquiring an input signal corresponding to the through current of the third phase 21;

applying a bandpass filter 81 on the input signal, centered on the frequency of the injected alternating signal;

measuring the voltage in the frequency band selected by the bandpass filter 81, this voltage measurement being an image of the inductance of the coil of the third phase 21.

The injected alternating signal has a frequency at least 5 times higher than that of the electric power supply, typically about 10 times higher than the frequency of the electric power supply.

As indicated above, the measured inductance is high if a tooth 23 of the rotor 9 is across from a coil of the third phase 21, and is low if a tooth 23 of the rotor is not across from a coil of the third phase 21 of the stator.

The third monitoring step further includes the following operations:
  periodically, recharging a counter to the value N'max, the counter being recharged to a period of T'obs;
  each time a high inductance is detected, i.e., each time a tooth 23 of the rotor passes across from a coil of the third phase 21, decreasing the counter by 1. The number of rotation steps of the rotor is considered to exceed the preset maximum N'max is the counter is brought back to 0.

Like before, the third step further includes an operation for cutting off the electric power supply of the electric motor 5, if the detected number of rotation steps exceeds the predetermined maximum number N'max. To that end, one acts on a third cutoff member, which is for example the breaker 27 of the electric power supply.

As previously explained, the kinematic chain 15 is configured so that the maximum number of electric pulses or rotation steps of the rotor drives a reactivity contribution in the core below a preset anti-reactivity limit β of the reactor, minus a margin preset by safety analyses. The margin is for example 10% of β.

Indeed, as described above, the monitoring method is designed so that the motor is cut off if one for example detects more than N'max rotation steps of the rotor over the duration T'obs or Nmax rotation steps of the rotor over the duration Tobs. This corresponds to a maximum number of rotation steps actually performed by the rotor of N0, in light of the reaction time of the cutoff members and the inertia of the kinematic chain. N0 is calculated using the formula provided below:

The reactivity injection corresponding to N0 steps is $$\Delta\rho 0 = N0 \times E$$

where E is the efficiency of the injection of reactivity, expressed in number of pcm per motor step. This efficiency depends on the design of the kinematic chain. E is chosen so that, in light of the sizing parameters also selected, Δρ0 always remains below β minus the margin.

Figure 7:
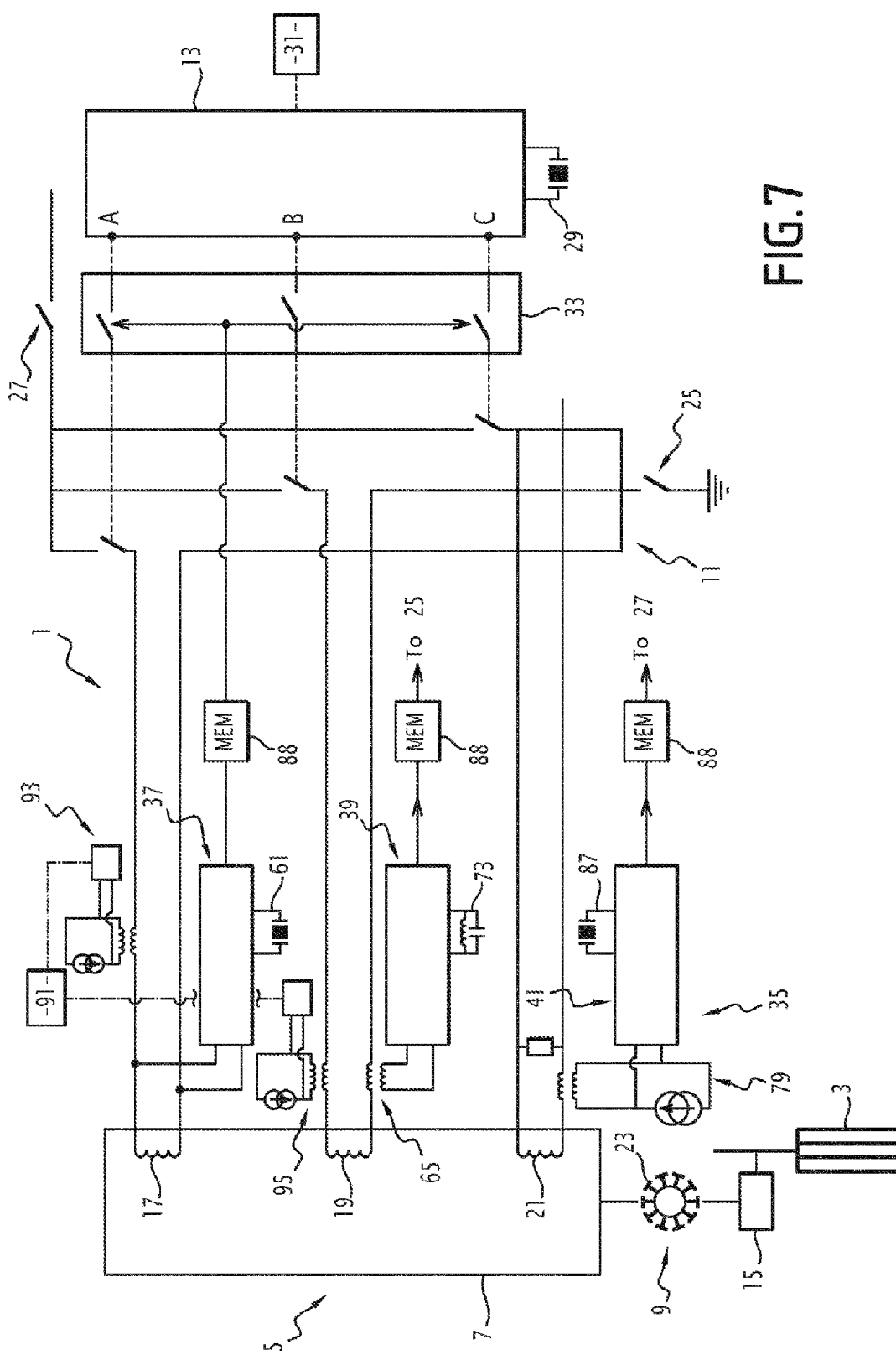
FIG. 7 is a schematic view similar to that of FIG. 1, for a second embodiment of the invention that comprises a unit for determining the position of the absorber.

A second embodiment will now be described in reference to FIG. 7. Only the differences between the second embodiment and the first embodiment will be outlined below. Identical elements or elements performing the same functions will be designated using the same references.

In the second embodiment, the monitoring device 35 includes a unit 91 for determining the position of the control absorber 3. It also includes a first unit 93 configured to measure the impedance across the terminals of the first phase 17, and/or a unit 95 measuring the impedance across the terminals of the second phase 19.

Furthermore, the third monitoring unit 41 measures the impedance across the terminals of the third phase 21.

The unit 91 for determining the absorber position uses the impedance measurements across the terminals of at least two of the first, second and third phases. Typically, it uses the impedance measurements across the terminals of all three phases.

The first unit 93 advantageously comprises means similar to those provided in the third monitoring unit 41 in order to measure the impedance, namely the source 79, the bandpass filter 81 and the voltage measuring member 83. Likewise, the second unit 95 advantageously comprises means similar to those provided in the third monitoring unit 41 in order to measure the impedance.

The first unit for measuring the impedance 93 supplies a signal to the unit 91 for determining the position of the absorber, each time a tooth of the rotor passes across from a coil of the first phase 17.

Likewise, the second unit for measuring the impedance 95 supplies a signal to the unit 91 each time a tooth of the rotor passes across from a coil of the second phase 19.

Furthermore, the third monitoring unit 41 supplies a signal to the unit 91 each time a tooth passes across from a coil of the third phase 21.

The unit 91 is configured to count the number of rotor steps and to determine the rotation direction of the rotor 9 based on the signals supplied by the units 41, 93 and 95. These units continuously supply the unit 91 with the number of passages of a rotor tooth in front of a phase 21, 17 or 19.

The unit 91 is configured, by using this information, to determine the insertion position of the control absorber 3 continuously.

As previously indicated, it suffices for only one of the first unit and the second unit to be equipped with an impedance-measuring sub-unit to be able to determine the rotation direction of the rotor. When all three subunits are equipped to measure the impedance across the terminals of the corresponding phase, one has an order 2 redundancy in order to determine the rotation direction. One then has an order 3 redundancy to determine the rotation speed of the rotor and the number of rotor steps.

It should be noted that in this case, it is imperative for the first monitoring unit 37 and the second monitoring sub-unit 41 to respectively be equipped with the low-pass filter 58 and the low-pass filter 69, in order to cut the frequencies of the voltage injected across the terminals of the phases 17 and 19.

Thus, the monitoring method according to the second embodiment of the invention includes, in addition to the first and second monitoring steps, a first or second measuring step during which, respectively, the number of rotation steps of the rotor is counted by measuring an impedance across the terminals of the first and second phase, the method further including a step for determining the position of the absorber using the impedance measurement across the terminals of at least two of the first, second and third phases.

Indeed, the impedance measurements across the terminals of two of the three phases make it possible to determine the rotation direction of the rotor continuously.

This information, coupled with the measurement of the number of rotation steps of the rotor, allows a continuous determination of the number of steps maneuvered and the rotation direction of the rotor, and therefore the position of the absorber.

Thus, in the present disclosure, a diversified instrumentation is established, preferably with a redundancy 3, making it possible to detect an increase to overspeed of the control absorber. Failure to detect the event "appearance of more than Nmax commands in an observation time Tobs or rotation of the rotor by more than N'max steps in a given observation time T'obs" would result in the combined failure of all of the diversified measuring channels. The likelihood of this accumulation of events is low enough to comply with the safety classification related to the serious consequence of this non-detection. This makes it possible only to perform a functional test of the entire drive mechanism when shutdowns occur. This test may be performed with the control absorbers separated from the motor. It is then possible to inject an excessive motor speed deliberately, to test the various units of the monitoring device.

It will also be stressed that the monitoring device acts directly on the controller and the electric power supply of the motor, without going through the centralized command control of the plant. This makes it possible on the one hand to have an extremely short reaction time, and on the other hand to avoid any shared mode with the centralized command control.

The first, second and third units 37, 39, 41 could be of a different type from that described above.

What is claimed is:

1. A drive mechanism for at least one nuclear reactor control absorber, the drive mechanism comprising:
    at least one electric motor of a stepping type comprising:
        a stator having at least a first phase, a second phase, and a third phase, and
        a rotor;
    an electric power supply, electrically connected to each of the first phase, the second phase and the third phase of the stator;
    a controller of the electric power supply, programmed so that the electric power supply delivers an electric pulse to each of the first phase, the second phase and the third phase at a current frequency, the electric pulse forming a control step with a shape adapted to control the at least one electric motor, the rotor being moved per unit of time by a number of rotation steps depending on the current frequency;
    a kinematic chain arranged to couple the rotor to the at least one nuclear reactor control absorber, the kinematic chain being arranged to convert a rotational movement of the rotor into a translational movement of the at least one nuclear reactor control absorber in a core of a nuclear reactor, with no possibility of slipping; and
    a monitor configured for monitoring a potential situation of increase to overspeed of the at least one nuclear reactor control absorber, the monitor comprising:
        at least two mutually independent monitoring units, each of the at least two mutually independent monitoring units being connected to terminals of one of the first phase, the second phase and the third phase, each of the at least two mutually independent monitoring units being configured to:
            measure a number of control steps delivered to the first phase, the second phase or the third phase during a time window of a preset duration or measure the number of rotation steps of the rotor during a time window of preset duration; and
            compare the number of control steps measured with a preset maximum or compare the number of rotation steps measured with a preset maximum.

2. The drive mechanism according to claim 1, wherein the monitoring units are at least a first mutually independent unit, a second mutually independent unit and a third mutually independent unit connected to the terminals of the first phase, the second phase, and the third phase, respectively, and
    the first mutually independent unit and the second mutually independent unit each being configured to measure the number of control steps during the time window of preset duration, and to cut off the electric power supply if the preset maximum is exceeded,
    the third mututally independent unit being configured to measure the number of rotation steps of the rotor during the time window of preset duration, and to cut off the electric power supply if the preset maximum is exceeded.

3. The drive mechanism according to claim 2, wherein the first mutually independent unit and the second mutually independent unit comprise at least one of the following circuits:
    a logic circuit configured to count a number of electric pulses delivered to the first phase or a number of electric pulses delivered to the second phase;
    an analog circuit configured to count the number of electric pulses delivered to the first phase or the number of electric pulses delivered to the second phase; or
    a logic or analog circuit for comparing the electric pulses respectively delivered to the first phase or the second phase with a preset profile.

4. The drive mechanism according to claim 2, wherein the third mutually independent unit is configured to detect a crossing of a rotation step by the rotor by measuring impedance across the terminals of the third phase of the stator.

5. The drive mechanism according to claim 4, wherein the monitor includes, in addition to the monitoring unit, a first measuring unit to measure an impedance across the terminal of the first phase and/or a second measuring unit configured to measure an impedance across the terminal of the second phase, and a unit using the impedance measurement across the terminals of at least two of the first, second and third phases to determine the position of the absorber.

6. The drive mechanism according to claim 2, wherein the first mutually independent unit, the second mutually independent unit, and the third mutually independent unit are configured to cut off the electric power supply by respectively acting on first, second and third mutually independent switches if the number of control steps or the number of rotation steps exceeds the corresponding preset maximum.

7. The drive mechanism according to claim 1, wherein the kinematic chain is configured so that a maximum number of electric pulses or a maximum number of rotation steps drives a reactivity contribution below an anti-reactivity limit excluding a preset prompt criticality accident of a reactor, minus a margin preset by safety analyses.

8. The drive mechanism according to claim 1, wherein the kinematic chain provides position maintenance even if the electric power supply is cutoff.

9. A method for monitoring a potential situation of increase to overspeed of a nuclear reactor control absorber equipped with a drive mechanism comprising:
    at least one electric motor of a stepping type comprising:
        a stator having at least a first phase, a second phase, and a third phase, and
        a rotor;
    an electric power supply, electrically connected to each of the first phase, the second phase and the third phase of the stator;
    a controller of the electric power supply, programmed so that the electric power supply delivers an electric pulse to each of the first phase, the second phase and the third phase at a current frequency, the electric pulse forming a control step with a shape adapted to control the at least one electric motor, the rotor being moved per unit of time by a number of rotation steps depending on the current frequency;

a kinematic chain arranged to couple the rotor to the at least one nuclear reactor control absorber, the kinematic chain being arranged to convert a rotational movement of the rotor into a translational movement of the at least one nuclear reactor control absorber in a core of a nuclear reactor, with no possibility of slipping;

the method including at least two mutually independent monitoring steps, each of the at least two mutually independent monitoring steps comprising:

measuring, across the terminals of one of the first, second and third phases, a number of control steps delivered to said phase during a time window of preset duration or the number of rotation steps of the rotor during a time window of preset duration; and comparing the number of measured control steps with a preset maximum or the number of measured rotation steps with a preset maximum.

10. The method as recited in claim 9 wherein the monitoring method includes:

first and second monitoring steps during which the number of control steps respectively delivered to the first and second phases during the time window of preset duration is measured across the terminals of the respective first and second phases, the electric supply being cut off if the preset maximum is exceeded; and a third monitoring step during which the number of rotation steps of the rotor during the time window of preset duration is measured across the terminals of the third phase, the electric supply being cut off if the preset maximum is exceeded.

11. The method as recited in claim 10 wherein, in the first and second monitoring steps, the number of control steps respectively delivered to the first phase and the second phase is counted by detecting the voltage edges or the current edges.

12. The method as recited in claim 10 wherein, in the third monitoring step, the number of rotation steps of the rotor is counted by measuring an impedance across the terminals of the third phase.

13. The method as recited in claim 12 wherein the method includes, in addition to the first and second monitoring steps, a first and/or second measuring step during which, respectively, the number of rotation steps of the rotor is counted by measuring an impedance across the terminals of the first and second phase, the method including a step for determining the position of the absorber using the impedance measurement across the terminals of at least two of the first, second and third phases.

14. The method as recited in claim 10 wherein during the first, second and third monitoring steps, the electric supply of the electric motor is cut off by respectively acting on first, second and third mutually independent switches if the number of electric pulses or the number of rotation steps exceeds the corresponding preset maximum.

15. The method as recited in claim 9, wherein the kinematic chain is configured so that the maximum number of electric pulses or rotation steps drives a reactivity contribution below an anti-reactivity limit excluding a preset prompt criticality accident of the reactor, minus a margin preset by safety analyses.

* * * * *